US009894458B2

United States Patent
Chan et al.

(10) Patent No.: US 9,894,458 B2
(45) Date of Patent: Feb. 13, 2018

(54) OPTIMIZING MTC UPDATES USING MBMS

(71) Applicant: Verizon Patent and Licensing Inc., Arlington, VA (US)

(72) Inventors: Yee Sin Chan, San Jose, CA (US); Jin Yang, Orinda, CA (US); Sergio Aguirre, Southlake, TX (US); Ye Huang, San Ramon, CA (US); Zheng Zhao, Plainsboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/137,647

(22) Filed: Apr. 25, 2016

(65) Prior Publication Data

US 2017/0311110 A1    Oct. 26, 2017

(51) Int. Cl.
*H04W 72/00* (2009.01)
*H04W 4/00* (2009.01)

(52) U.S. Cl.
CPC ........... *H04W 4/001* (2013.01); *H04W 4/005* (2013.01); *H04W 72/005* (2013.01)

(58) Field of Classification Search
CPC ..... H04W 16/12; H04W 16/14; H04W 88/06; H04W 72/04; H04W 72/02; H04W 24/00; H04W 72/082; H04W 28/08
USPC ........ 455/436–440, 443–453, 512–513, 522; 370/312, 328–334
See application file for complete search history.

(56) References Cited

U.S. PATENT DOCUMENTS

| | | | | |
|---|---|---|---|---|
| RE42,697 E | * | 9/2011 | Sainton | H04W 16/02 455/453 |
| 8,923,234 B2 | * | 12/2014 | Park | H04W 48/16 370/252 |
| 2003/0074476 A1 | * | 4/2003 | Kim | H04L 1/0013 709/246 |
| 2005/0063336 A1 | * | 3/2005 | Kim | H04L 1/0025 370/329 |
| 2007/0117518 A1 | * | 5/2007 | Cai | H04W 72/005 455/67.13 |
| 2009/0274224 A1 | * | 11/2009 | Harris | H04L 1/003 375/260 |
| 2011/0019768 A1 | * | 1/2011 | Nammi | H04B 7/0452 375/295 |
| 2011/0022682 A1 | * | 1/2011 | Zanger | H04L 41/0896 709/219 |
| 2011/0281614 A1 | * | 11/2011 | Kitahara | H04W 52/146 455/522 |

(Continued)

*Primary Examiner* — Dai A Phuong

(57) ABSTRACT

A base station may include logic configured to determine system throughput values for a plurality of modulation and coding schemes based on data throughput values and based on a number of user equipment (UE) devices serviced by the base station; determine a modulation and coding scheme, of the plurality of coding schemes, that is associated with a highest system throughput; and determine radio frequency (RF) conditions associated with the base station. The logic may further be configured to define a Multimedia Broadcast Multicast Service (MBMS) area based on the determined RF conditions and the selected modulation and coding scheme and provide an update to the UE devices serviced by the base station, wherein UE devices located within the defined MBMS area are sent the update using MBMS and UE devices located outside the defined MBMS area are sent the update using unicast.

20 Claims, 10 Drawing Sheets

(56) References Cited

U.S. PATENT DOCUMENTS

| | | | | |
|---|---|---|---|---|
| 2013/0294545 | A1* | 11/2013 | Chen | H04L 25/061 |
| | | | | 375/319 |
| 2015/0124686 | A1* | 5/2015 | Zhang | H04W 76/002 |
| | | | | 370/312 |
| 2015/0305004 | A1* | 10/2015 | Ohta | H04W 16/04 |
| | | | | 370/330 |
| 2016/0374050 | A1* | 12/2016 | Prasad | H04W 4/06 |
| 2016/0374107 | A1* | 12/2016 | Das | H04W 48/16 |

* cited by examiner

520 →

| MCS SCHEME COLUMN 610 | DATA THROUGHPUT COLUMN 620 | SERVICE AREA COLUMN 630 | NUMBER OF UEs COLUMN 640 | SYSTEM THROUGHPUT COLUMN 650 |
|---|---|---|---|---|
| MCS SCHEME 612-A | DATA THROUGHPUT 622-A | SERVICE AREA 632-A | NUMBER UEs 642-A | SYSTEM THROUGHPUT 652-A |
| ⋮ | ⋮ | ⋮ | ⋮ | ⋮ |
| MCS SCHEME 612-N | DATA THROUGHPUT 622-N | SERVICE AREA 632-N | NUMBER OF UEs 642-N | SYSTEM THROUGHPUT 652-N |

FIG. 6

OPTIMIZING MTC UPDATES USING MBMS

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices. For example, a base station may service a large number of wireless devices. At times, many of the wireless devices may need to communicate or receive information within a particular period of time, overwhelming the resources of the base station or the wireless access network.

BRIEF DESCRIPTION OF THE DRAWINGS

FIG. 6 is a diagram illustrating exemplary components of the throughput table of FIG. 5;

DETAILED DESCRIPTION OF PREFERRED EMBODIMENTS

Figure 1:
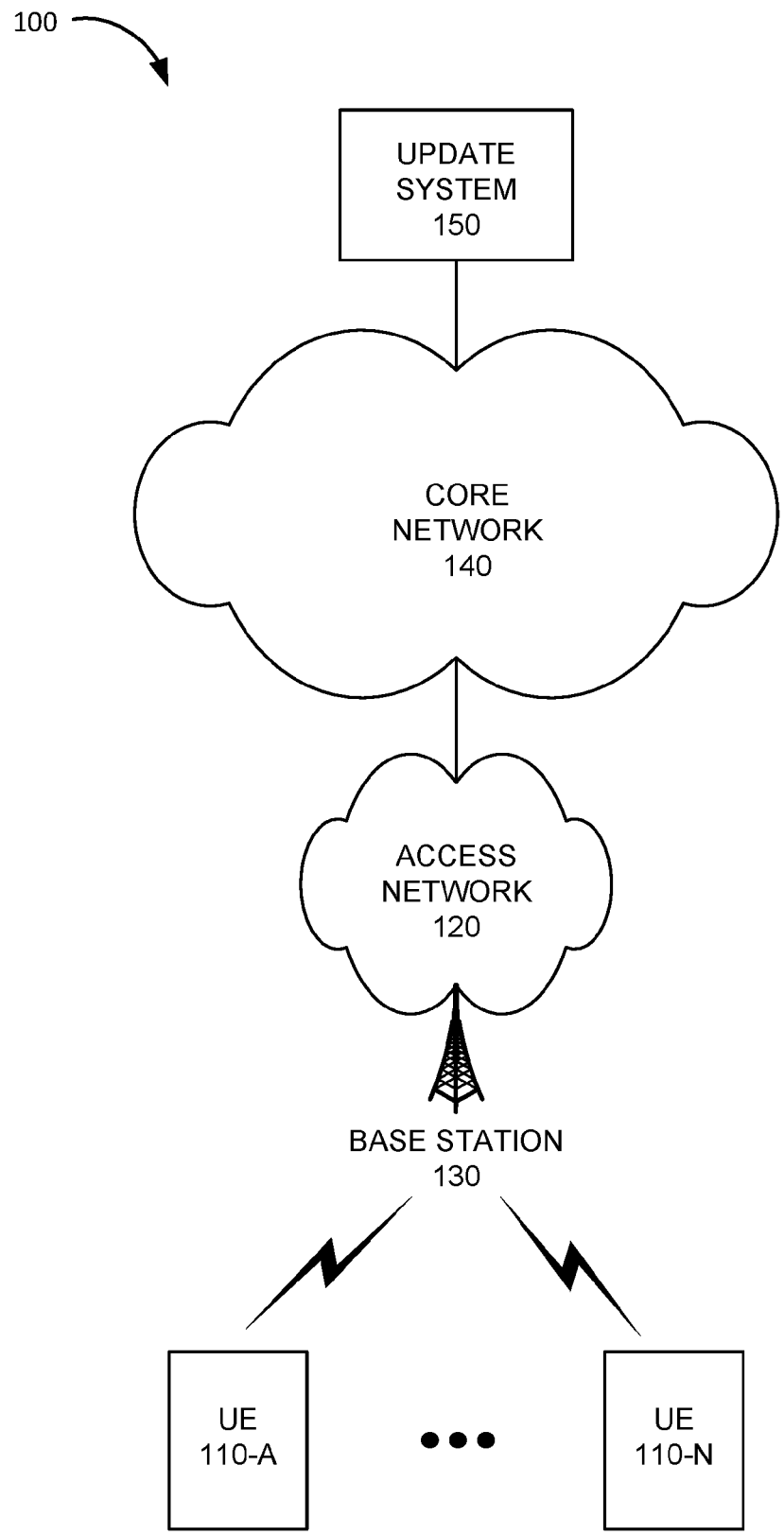
FIG. 1 is a diagram illustrating an environment according to an implementation described herein.

The following detailed description refers to the accompanying drawings. The same reference numbers in different drawings identify the same or similar elements.

A provider of wireless communication services may manage wireless access networks that include a large number of network devices. For example, a wireless access network may provide communication services for devices in Internet of Things (IoT) applications. Such devices may communicate using machine-to-machine (M2M) communication, such as machine-type communication (MTC), a type of M2M communication standardized by the $3^{rd}$ Generation Partnership Project (3GPP), and/or another type of M2M communication. Examples of MTC devices may include utility meters, parking meters, road sensors, environmental sensors, security sensors, traffic and/or road lights, traffic cameras, advertising displays, vehicle telematics devices, point-of-sale terminals, vending machines, health monitoring devices, remote diagnostics devices, access control device, and/or other types of devices. MTC devices are envisioned to increase exponentially and may result in a large number of such devices being serviced by a wireless access network.

While the data consumption of MTC devices may be small compared to other types of devices, such as mobile phones used by users for voice communication or for consuming streaming content, significant challenges may nevertheless arise when a software update is required for a large number MTC devices. For example, a software update for a set of utility meters in a particular geographic area may require communication with a large number of devices within a short period of time. A software update may include an update to a set of instructions in a device, an update to data stored on the device, an update to an interface on the device, and/or any other type of update.

In order to avoid having to establish a communication session with each MTC device, a wireless access network may utilize a multicast/broadcast method to deliver a software update simultaneously to a large number of MTC devices. For example, the wireless access network may use a Multimedia Broadcast Multicast Service (MBMS) method, such as evolved MBMS (eMBMS) for Long Term Evolution (LTE) wireless access networks, to deliver the update. In contrast to unicast method, which is a point-to-point method that may require that a communication session be individually established with each device, a multicast/broadcast method is a point-to-multipoint method that enables sending a message simultaneously to all devices in a multicast/broadcast group.

MBMS may be used to deliver multicast video streaming. Furthermore, in addition to video streaming, MBMS methods (e.g., eMBMS) may be used as a file delivery service to send a same file to a large number of devices within a service area. A content delivery network (CDN) may provide the file to a Broadcast/Multicast Service Center (BM-SC) as an over-the-air (OTA) file. The OTA file may be sent as a one-time deliver or as a carousel delivery (e.g., repeated transmissions) to ensure all devices in a multicast group (e.g., a Multicast-broadcast single-frequency network (MBSFN) receive the OTA file. Once a file delivery is complete, eMBMS may provide the functionality for a device to repair the received file via unicast if any symbols were lost during transmission. If repair cannot be performed, the device may fetch the entire file from the BM-SC via unicast.

However, the data rate of MBMS may be limited by the device with the poorest radio frequency (RF) conditions. Low quality RF conditions result in lower data throughput rates, because it may take longer to successfully transmit the same amount of data and/or because a modulation and coding scheme (MCS) may need to be selected that is associated with a lower data throughput rate. Thus, if some of the devices that are to receive an MBMS communication are located in an RF adverse area (e.g., the devices are required to communicate using baseband), the data throughput for the MBMS communication may be limited by the data throughput rate available to the devices in the RF adverse area.

Implementations described herein relate to dividing a service area into an MBMS region and a non-MBMS region. Devices within the MBMS region may receive software updates via MBMS and devices outside the MBMS region may receive software updates via unicast. Furthermore, different MBMS areas may be associated with different system throughputs. System throughput may refer to the total data throughput for the devices serviced by a particular base station. If the MBMS region is increased, more devices may receive updates via MBMS, but the system throughput may decrease, because the data throughput may be limited by the throughput available to devices located further away from the base station and experiencing poorer RF conditions. If the MBMS region is decreased, fewer devices may receive updates via MBMS, but the updates may be provided at higher data throughput rates. Thus, a tradeoff may exist between the MBMS area and the data throughput rates. Therefore, implementations described herein further relate to optimizing the MBMS region to maximize system throughput.

A change in the system throughput may be determined based on:

$$\Delta C = P(A+\Delta A)*MCS(A+\Delta A) - P(A)*MCS(A) \qquad (1)$$

wherein C corresponds to the system throughput, A corresponds to the area, P corresponds to the number of devices, MCS corresponds to the data throughput of a particular modulation and coding scheme, and $\Delta$ defines a change in the corresponding parameter. Thus, determining the maximum system throughput corresponds to an optimization problem wherein C is optimized. However, since the modulation and coding schemes are a discrete set, the maximum system throughput may be determined by generating a table that relates the modulation and coding schemes to system throughput values.

Implementations described herein may include determining system throughput values for a set of modulation and coding schemes based on data throughput values and based on a number of user equipment (UE) devices serviced by a base station. For example, a base station, and/or another device in a wireless access network, may select a modulation and coding scheme and may determine a data throughput for the selected modulation and coding scheme based on one or more quality of service requirements. The base station and/or other device may then determine a service area for the selected modulation and coding scheme based on the RF conditions determined for the base station, may determine the number of devices serviced by the base station that are within the service area, and may determine the system throughput for the selected modulation and coding scheme based on the determined data throughput and the determined number of devices within the service area. The process may be repeated for all the modulation and coding schemes in the set and a throughput table may be generated based on the information. The throughput table may thus relate particular modulation and coding schemes to system throughput values.

The base station, and/or other device in the wireless access network, may then select the modulation and coding scheme associated with the highest system throughput, may determine the RF conditions associated with the base station, and may define an MBMS area based on the determined RF conditions and based on the selected modulation and coding scheme. The base station and/or other device may then provide updates to the devices serviced by the base station based on the defined MBMS area, such that devices within the MBMS area are sent updates using MBMS and devices serviced by the base station that are outside the defined MBMS area are sent updates using unicast. The MBMS area may remain stable in MTC applications, as devices in IoT applications may include fixed wireless devices installed in particular locations and subject to a stable set of RF conditions.

The base station and/or other device may identify a first set of devices, from the devices serviced by the base station, which are located within the defined MBMS area and may designate the first set of devices to receive updates via MBMS. The base station and/or other device may further identify a second set of devices, from the devices serviced by the base station, which are located outside the defined MBMS area and may designate the second set of devices to receive updates via unicast. Thus, when an update is received (e.g., from a server device configured to manage a set of devices serviced by the base station), the base station may send the update via MBMS to the first set of devices and may then send the update via unicast to the second set of devices.

The devices serviced by the base station may be configured to wake up at a particular time, such as a scheduled update time, in order to coordinate a subsequent update process. The configuration to schedule the wake up may be performed by providing the configuration commands during normal operation of the devices in order to avoid a large amount of signaling to page the devices to wake up when an update is received.

The MBMS area may be updated based on a change in the number of devices serviced by the base station. Thus, if a change (i.e., increase or decrease) is detected in the number of devices serviced by the base station that is greater than a change threshold, the system throughput values may be recalculated for the set of modulation and coding schemes.

Furthermore, in some implementations, the MBMS area may be changed based on particular parameters. As an example, the MBMS area may be changed based on a size of an update. A small update may require a small data throughput and a larger MBMS area may be used for a small update. In contrast, a large update may require a larger data throughput and a smaller MBMS area may be used for the large update. As another example, RF conditions for the area serviced by the base station may vary for particular times of day or particular days of week as a result of changes in atmospheric conditions, traffic conditions, interference from other RF sources, and/or other causes. Thus, different MBMS areas may be defined for different times of day and/or different days of week based on different system throughput values computed for the different times of day and/or different days of week. Furthermore, the base station may monitor the RF conditions for the service area and may trigger a re-calculation of the defined MBMS area if a change in the RF conditions is detected that is greater than an RF change threshold.

FIG. 1 is a diagram of an exemplary environment 100 in which the systems and/or methods, described herein, may be implemented. As shown in FIG. 1, environment 100 may include user equipment (UE) devices 110-A to 110-N (referred to herein collectively as "UE devices 110" and individually as "UE device 110"), an access network 120, a core network 140, and an update system 150.

In some implementations, UE device 110 may correspond to an embedded wireless device that communicates wirelessly with other devices over an M2M interface using MTC and/or another type of M2M communication. As an example, UE device 110 may be electrically connected to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

In other implementations, UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.) , a global positioning system (GPS) device; a laptop computer, a tablet computer, or another type of portable computer; a media playing device; a portable gaming system; a home appliance device; a home monitoring device; and/or any other type of computer device with wireless communication capabilities.

Access network 120 may provide access to core network 140 for wireless devices, such as UE device 110. Access network 120 may enable UE device 110 to provide mobile telephone service and/or data services to UE device 110. Access network 120 may include a base station 130 and UE device 110 may wirelessly communicate with access network 120 via base station 130. Base station 130 may service UE devices 110-A to 110-N. In other words, UE devices 110-A to 110-N may be located within the geographic area serviced by base station 130. Access network 120 may establish a packet data network connection between UE device 110 and core network 140. For example, access network 120 may establish an Internet Protocol (IP) connection between UE device 110 and core network 140.

In some implementations, access network 120 may include a Long Term Evolution (LTE) access network (e.g., an evolved packet core (EPC) network) based on the LTE standard specified by the $3^{rd}$ Generation Partnership Project (3GPP). In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE device 110, and may interface with other external networks. Core network 140 may include one or more server devices and/or network devices, or other types of computation or communication devices. In one example implementation, core network 140 may include an Internet Protocol Multimedia Subsystem (IMS) network (not shown in FIG. 1). An IMS network may include a network for delivering IP multimedia services as specified by 3GPP or other standards/protocols and may provide media flows between UE device 110 and external IP networks or external circuit-switched networks (not shown in FIG. 1).

Update system 150 may include one or more devices, such as computer devices and/or server devices, which manage UE devices 110-A to 110-N and provides software updates to UE devices 110-A to 110-N. For example, if UE devices 110-A to 110-N include utility meters, update system 150 may collect, store, and analyze meter readings from UE devices 110-A to 110-N and which sends updates to UE devices 110-A to 110-N at particular intervals and/or when an update is generated by an administrator. For example, the administrator may change an authentication protocol and/or credentials, may update a data collection algorithm, may update an application installed on UE devices 110-A to 110-N, and/or may generate another type of update. Update system 150 may send the update to UE devices 110-A to 110-N via core network 140, access network 120, and base station 130.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
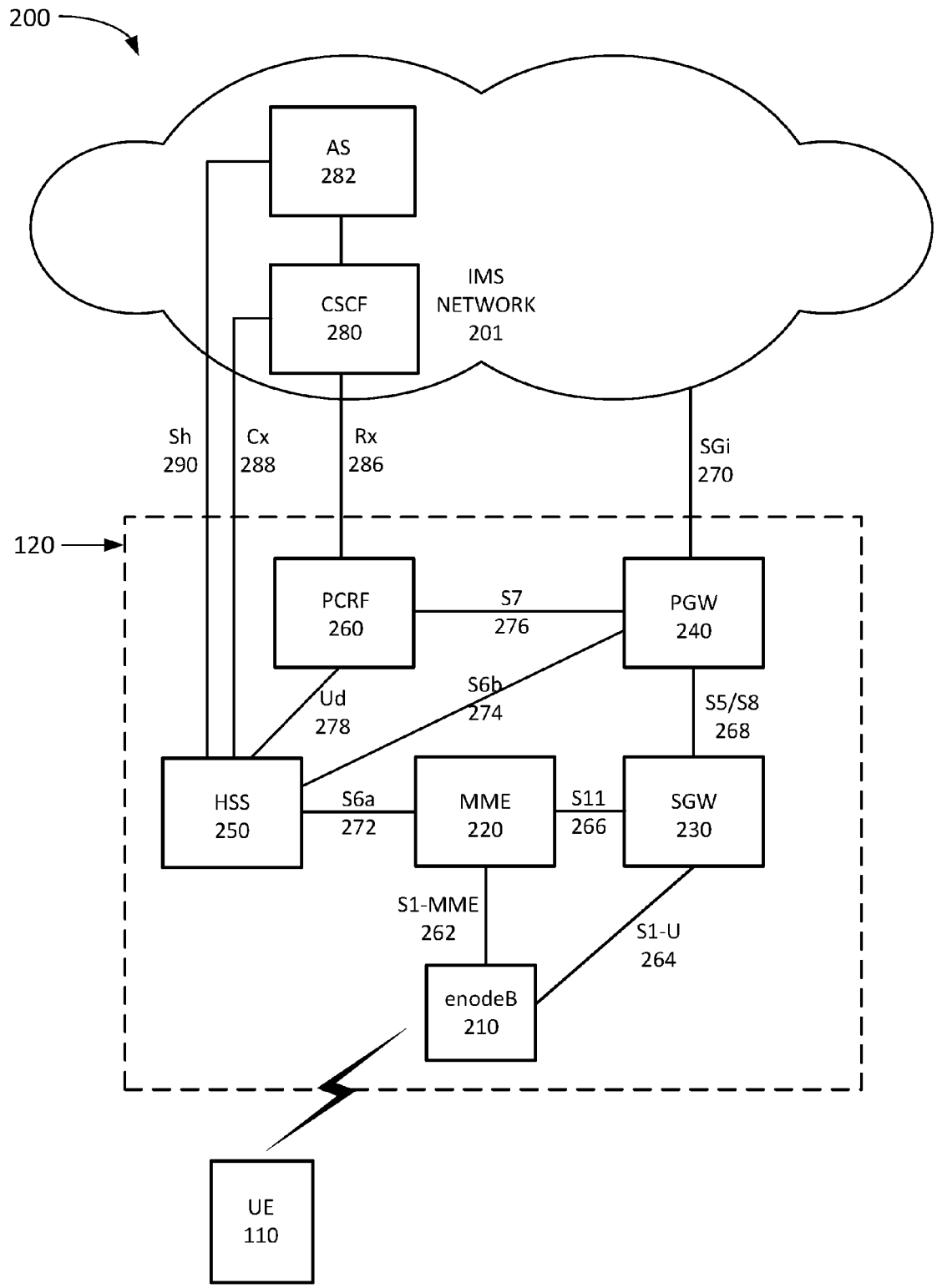
FIG. 2 is a diagram illustrating exemplary components of the access network of FIG. 1 and exemplary components of an Internet Protocol Multimedia Subsystem network that may be included in the core network of FIG. 1.

FIG. 2 is a diagram illustrating exemplary components of a system 200 that includes access network 120 and an IMS network 201 according to an implementation described herein. IMS network 201 may be included in core network 140 and may include a network for delivering IP multimedia services as specified by 3GPP or other standards/protocols and may provide media flows between UE device 110 and external IP networks or external circuit-switched networks. In some implementations, IMS network 201 may be used to deliver an update from update system 150 to UE device 110.

As shown in FIG. 2, system 200 may include UE device 110, access network 120, and IMS network 201. Access network 120 may correspond to a Long Term Evolution (LTE) access network. Access network 120 may include one or more devices that implement logical entities interconnected via standardized interfaces, and that provide wireless packet-switched services and wireless IP connectivity to user devices for both data and voice services. Access network 120 may include eNodeB 210 (corresponding to base station 130), a mobility management entity (MME) 220, a serving gateway (SGW) 230, a packet data network gateway (PGW) 240, a home subscriber server (HSS) 250, and a Policy and Charging Rules Function (PCRF) 260. IMS network 201 may include a Call Session Control Function (CSCF) 280 and an Application Server (AS) 282. While FIG. 2 depicts a single eNodeB 210, MME 220, SGW 230, PGW 240, HSS 250, PCRF 260, CSCF 280, and AS 282 for illustration purposes, in other implementations, FIG. 2 may include multiple eNodeBs 210, MMES 220, SGWs 230, PGWs 240, HSS's 250, PCRFs 260, CSCFs 280, and/or AS's 282.

eNodeB 210 may include one or more devices (e.g., base stations) and other components and functionality that allow UE device 110 to wirelessly connect to access network 120. eNodeB 210 may include or be associated with one or more cells. For example, each cell may include a radio frequency (RF) transceiver facing a particular direction. eNodeB 210 may interface with access network 120 via an interface referred to as an S1 interface, which may be split into a control plane S1-MME interface 262 and a data plane S1-U interface 264. S1-MME interface 262 may interface with MME 220. S1-MME interface 262 may be implemented, for example, with a protocol stack that includes a Network Access Server (NAS) protocol and/or Stream Control Transmission Protocol (SCTP). An S1-U interface 264 may interface with SGW 230 and may be implemented, for example, using GTPv2.

MME 220 may implement control plane processing for access network 120. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMES 220 in access network 120 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 268. S5/S8 interface 268 may be implemented, for example, using GTPv2.

PGW 240 may function as a gateway to core network 140 and/or IMS network 201 through an SGi interface 270. A particular UE device 110, while connected to a single SGW 230, may be connected to multiple PGWs 240, one for each packet network with which UE device 110 communicates.

MME 220 may communicate with SGW 230 through an S11 interface 266. S11 interface 266 may be implemented, for example, using GTPv2. S11 interface 266 may be used to create and manage a new session for a particular UE device 110. S11 interface 266 may be activated when MME 220 needs to communicate with SGW 230, such as when the particular UE device 110 attaches to access network 120, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e. g., authorized to connect to access network 120 and to IMS network 201 via access network 120).

MME 220 may communicate with HSS 250 through an S6a interface 272. S6a interface 272 may be implemented, for example, using a Diameter protocol. PGW device 240 may communicate with HSS device 250 through an S6b interface 274. S6b interface 274 may be implemented, for example, using a Diameter protocol.

PCRF 260 may implement policy charging and rule functions, such as establishing Quality of Service (QoS) requirements, bandwidth, and/or charges for a particular service for a UE device 110. PCRF 260 may communicate with PGW 240 through an S7 interface 276 and may communicate with HSS 250 through a Ud interface 278. S7 interface 276 may be based on a legacy Gx interface and may be implemented, for example, using Diameter protocol. Ud interface 278 may be used to exchange subscription data between PCRF 260 and HSS 250 and may be based on a provider specified protocol.

IMS network 201 may be associated with an IMS core identity for a particular subscription for UE device 110. HSS 250 may receive information identifying the IMS core identity for a subscription and may provide the IMS core identity to a particular UE device 110 that is connected to access network 120. CSCF device 280 may handle signaling, controlling of media paths, and activation of applications in IMS network 201. AS device 282 may implement particular services and interact with CSCF device 280 to deliver the particular services to UE device 110. Examples of services provided by AS device 282 may include update services for update system 150. CSCF 280 may communicate with PCRF 260 through an Rx interface 286 and may communicate with HSS 250 through a Cx interface 288. Rx interface 286 and Cx interface 288 may be implemented, for example, using Diameter protocol. AS 282 may communicate with HSS 250 through an Sh interface 290. Sh interface 290 may be implemented, for example, using Diameter protocol.

Although FIG. 2 shows exemplary components of access network 120 and IMS network 201, in other implementations, access network 120 and/or IMS network 201 may include fewer components, different components, differently arranged components, or additional components than depicted in FIG. 2. Additionally or alternatively, one or more components of access network 120 and/or IMS network 201 may perform functions described as being performed by one or more other components of access network 120 and/or IMS network 201.

Figure 3:
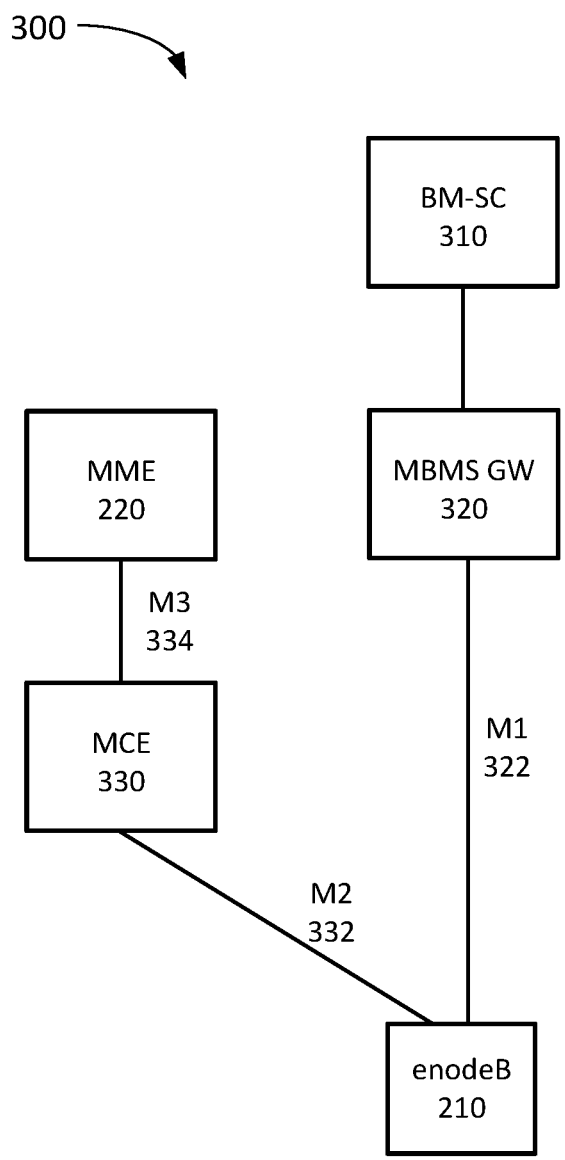
FIG. 3 is a diagram illustrating exemplary components of a multimedia broadcast multicast service (MBMS) system according to an implementation described herein.

FIG. 3 is a diagram illustrating exemplary components of an MBMS system 300 according to an implementation described herein. As shown, MBMS system 300 may include a broadcast/multicast service center (BM-SC) 310, an MBMS gateway (GW) 320, MME 220, and a multicell/multicast coordination entity (MCE) 330.

BM-SC 310 may receive content intended for multicast/broadcast distribution and may add application layer forward error correction (FEC) to add redundancy to the content. BM-SC 310 may forward the content to MBMS GW 320. Furthermore, BM-SC 310 may support file repair and/or file retrieval via unicast if a particular UE device 110 does not receive a complete file during a multicast transmission.

MBMS GW 320 may serve as a gateway between an IP network and the radio network serviced by eNodeB 210. If multiple eNodeBs 210 are involved in the distribution of content, MBMS GW 320 may forward the multicast/broadcast content to all eNodeBs 210 participating in the content distribution. Furthermore, MBMS GW 320 routes MBMS session control signaling to MMES 220 that serve the eNodeBs 210 participating in the content distribution. MBMS GW 320 may communicate with eNodeB 210 through an M1 interface 322. M1 interface 322 may be implemented, for example, using SYNC protocol. In some implementations, MBMS GW 320 may be implemented in PGW 240 or PGW 240 and MBMS GW 320 may be implemented in the same device. In other implementations, MBMS GW 320 may be implemented in a device separate and/or different from PGW 240.

MCE 330 may coordinate transmission between different cells of an eNodeB 210 and/or between multiple eNodeBs 210. MCE 330 may allocate and coordinate the resources used by multiple eNodeBs 210 participating in content distribution and may select a particular modulation and coding scheme for a particular multicast/broadcast transmission. Thus, radio scheduling and configuration roles performed by an eNodeB 210 during a unicast transmission may be centralized in MCE 330 during a multicast transmission (e.g., if multiple eNodeBs 210 are participating in the multicast transmission). MCE 330 may communicate with eNodeB 210 through an M2 interface 332 and MME 220 may communicate with MCE 330 through an M3 interface 334. M2 interface 332 and M3 interface 334 may be implemented, for example, using SCTP protocol.

In some implementations, MCE 330 may be implemented in eNodeB 210 or MCE 330 and eNodeB 210 may be implemented in the same device. In other implementations, MCE 330 may be implemented in MME 220 or MCE 330 and MME 220 may be implemented in the same device. In yet other implementation, MBMS GW 320 may be implemented in a device that is separate and/or different from eNodeB 210 and MME 220.

Although FIG. 3 shows exemplary components of MBMS system 300, in other implementations, MBMS system 300 may include fewer components, different components, differently arranged components, or additional components than depicted in FIG. 3. Additionally or alternatively, one or more components of MBMS system 300 may perform functions described as being performed by one or more other components of MBMS system 300.

Figure 4:
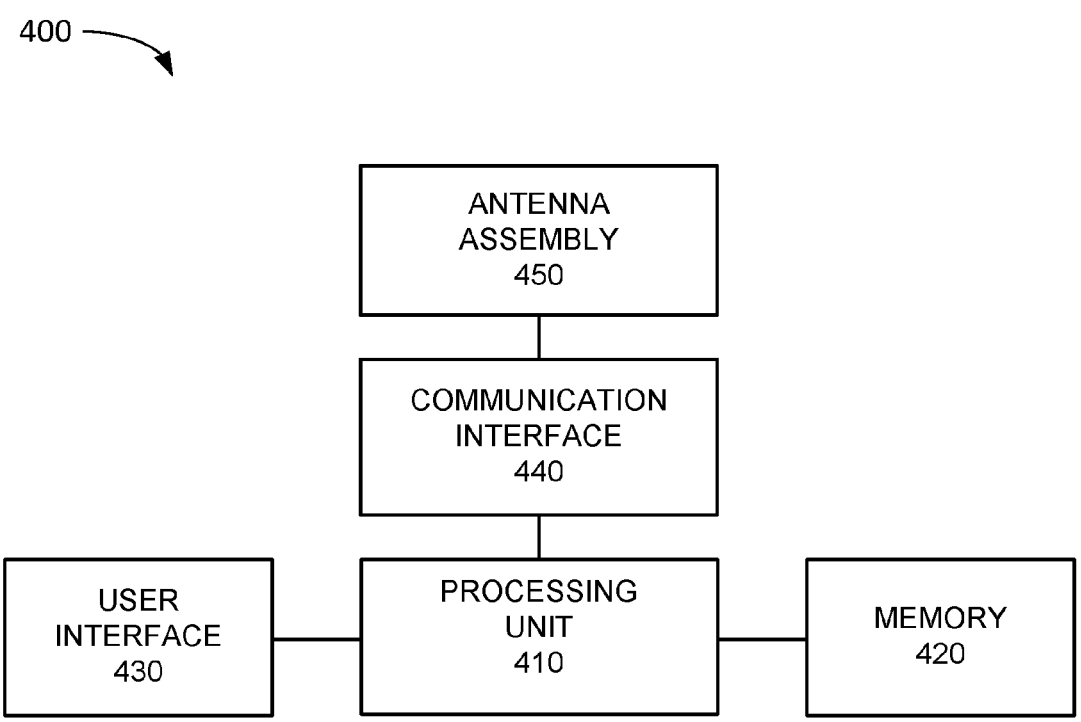
FIG. 4 is a diagram illustrating exemplary components of a device that may be included in a component of FIG. 2.

FIG. 4 is a diagram illustrating exemplary components of device 400 according to an implementation described herein. eNodeB 210, MME 220, SGW 230, PGW 240, HSS 250, PCRF 260, CSCF 280, AS 282, BM-SC 310, MBMS GW 320, and/or MCE 330 may each include one or more devices 400. As shown in FIG. 4, device 400 may include a processing unit 410, a memory 420, a user interface 430, a communication interface 440, and an antenna assembly 450.

Processing unit 410 may include one or more single-core or multi-core processors, microprocessors, microcontrollers, application specific integrated circuits (ASICs), field programmable gate arrays (FPGAs), graphical processing units (GPUs), and/or other processing logic. Processing unit 410 may control operation of device 400 and its components.

Memory 420 may include any type of dynamic storage device that may store information and/or instructions, for execution by processing unit 410, and/or any type of non-volatile storage device that may store information for use by processing unit 410. For example, memory 420 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

User interface 430 may allow a user to input information to device 400 and/or to output information from device 400. Examples of user interface 430 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 400 to vibrate; and/or any other type of input or output device. In some implementations, device 400 may be managed remotely and may not include user interface 430. In other words, device 400 may be "headless" and may not include a display, for example.

Communication interface 440 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 440 may include a transmitter that converts baseband signals to radio frequency (RF) signals and/or a receiver that converts RF signals to baseband signals. Communication interface 440 may be coupled to antenna assembly 450 for transmitting and receiving RF signals.

Communication interface 440 may include a logical component that includes input and/or output ports, input and/or output systems, and/or other input and output components that facilitate the transmission of data to other devices. For example, communication interface 440 may include a network interface card (e.g., Ethernet card) for wired communications and/or a wireless network interface (e.g., a WiFi) card for wireless communications. Communication interface 440 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 450 may include one or more antennas to transmit and/or receive RF signals. Antenna assembly 450 may, for example, receive RF signals from communication interface 440 and transmit the signals and receive RF signals and provide them to communication interface 440. In some implementations, device 400 may be configured to communicate via wired connections and may not include antenna assembly 450. For example, if device 400 is included in eNodeB 210, device 400 may include antenna assembly 450. On the other hand, if device 400 is included in MME 220, SGW 230, PGW 240, HSS 250, PCRF 260, CSCF 280, AS 282, BM-SC 310, MBMS GW 320, and/or MCE 330, device 400 may not include antenna assembly 450.

As described herein, device 400 may perform certain operations in response to processing unit 410 executing software instructions contained in a computer-readable medium, such as memory 420. A computer-readable medium may be defined as a non-transitory memory device. A non-transitory memory device may include memory space within a single physical memory device or spread across multiple physical memory devices. The software instructions may be read into memory 420 from another computer-readable medium or from another device via communication interface 440. The software instructions contained in memory 420 may cause processing unit 410 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Additionally or alternatively, one or more components of device 400 may perform the tasks described as being performed by one or more other components of device 400.

Figure 5:
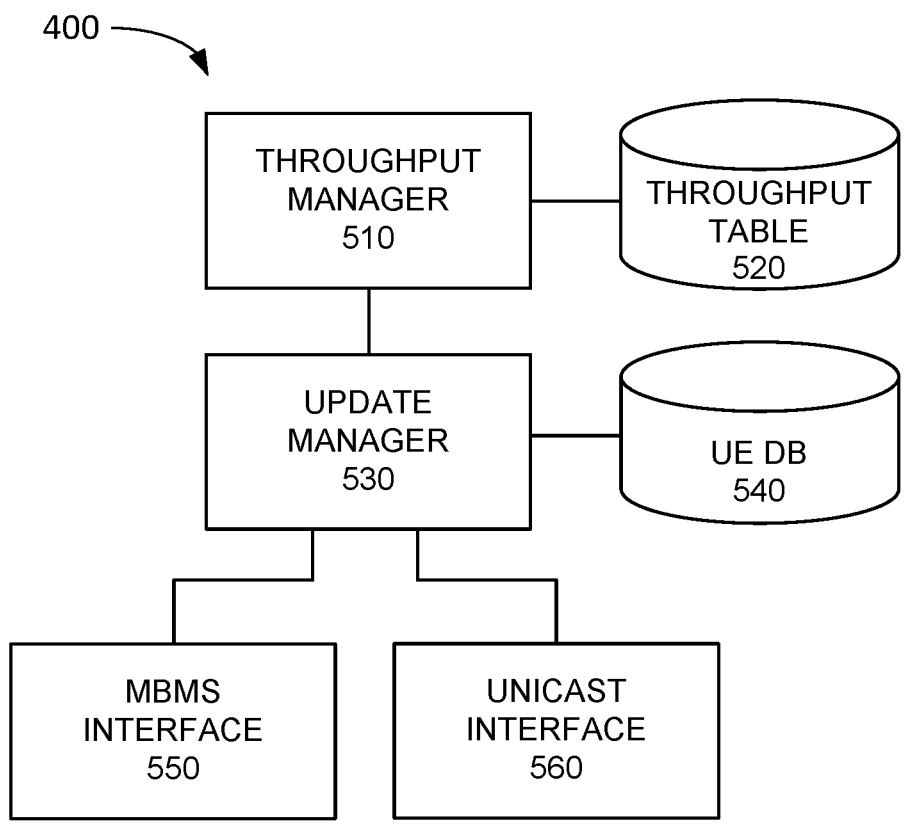
FIG. 5 is a diagram illustrating exemplary functional components of the device of FIG. 4.

FIG. 5 is a diagram illustrating exemplary functional components of device 400 according to an implementation described herein. The functional components of device 400 may be implemented, for example, via processing unit 410 executing instructions from memory 420. Alternatively, some or all of the functional components of device 400 may be implemented via hard-wired circuitry. As shown in FIG. 5, device 400 may include a throughput manager 510, a throughput table 520, an update manager 530, a UE database (DB) 540, an MBMS interface 550, and a unicast interface 560.

Throughput manager 510 may manage the system throughput for base station 130. For example, throughput manager 510 may determine system throughput values for different modulation and coding schemes associated with base station 130 based on data throughput values for the modulation and coding schemes, based on the number of UE devices 110 serviced by the base station 130, and based on the RF conditions associated with base station 130.

Throughput table 520 may relate system throughput values to particular modulation and coding schemes based on information determined by throughput manager 510. Exemplary information that may be stored in throughput table 520 is described below with reference to FIG. 6. While a single throughput table 520 is shown in FIG. 5 for illustrative purposes, in practice, device 400 may include multiple throughput tables 520. As an example, different throughput tables 520 may be generated for updates of different data size. As another example, different throughput tables 520 may be generated for different times of day or days of week based on different RF conditions during different times of day or days of week. As yet another example, different throughput tables 520 may be generated for different sets of quality of service requirements.

Update manager 530 may manage updates for UE devices 110 serviced by base station 130. For example, update manager 530 may schedule an update based on information received from update system 150. Update manager 530 may instruct UE devices 110 to wake up at a particular time for which an update has been scheduled. Update manager 530 may receive an update from update system 150 and may provide the update to the UE devices 110 based on information obtained from throughput manager 510 and based on information stored in UE DB 540. UE DB 540 may store information relating to UE devices 110 that are serviced by base station 130. For example, UE DB 540 may store, for each UE device 110 serviced by base station 130, information identifying UE device 110, information identifying the location of UE device 110, information identifying modulation and coding schemes available to UE device 110, information identifying RF conditions associated with UE device 110, information identifying whether UE device 110 has been designated as being within a defined MBMS area or being outside the defined MBMS area, and/or other types of information associated with UE 110.

Throughput manager 510 may select a modulation and coding scheme for the update and update manager 530 may determine which UE devices 110 are to receive an update via MBMS and which UE devices 110 are to receive the update via unicast. Update manager 530 may send the update to UE devices 110 using MBMS interface 550 and/or unicast interface 560.

MBMS interface 550 may communicate with UE device 110 to send an MBMS message to UE device 110. For example, MBMS interface 550 may generate a multicast/broadcast group, may add UE devices 110 to the multicast/broadcast group, and may multicast or broadcast a message to UE devices 110 in the multicast/broadcast group such that the UE devices 110 receive the message at substantially the same time. Unicast interface 560 may communicate with UE devices 110 to send a unicast message to UE devices 110. For example, unicast interface 560 may establish a communication message with a particular UE device 110 and may send a unicast message to the particular UE device 110.

Although FIG. 5 shows exemplary functional components of device 400, in other implementations, device 400 may include fewer functional components, different functional components, differently arranged functional components, or additional functional components than depicted in FIG. 5. Additionally or alternatively, one or more functional components of device 400 may perform functions described as being performed by one or more other functional components of device 400.

FIG. 6 is a diagram illustrating exemplary components of throughput table 520. As shown in FIG. 6, throughput table 520 may include a modulation and coding scheme column 610, a data throughput column 620, a service area column 630, a number of UEs column 640, and a system throughput column 650.

Modulation and coding scheme column 610 may include entries for particular modulation and coding schemes used by base station 130 to communicate with UE devices 110. Modulation and coding scheme column 610 may include modulation and coding scheme entries 612-A to 612-N. Each modulation and coding scheme entry 612 may identify a particular modulation and coding scheme, such as a modulation and coding scheme identified by an LTE MCS index (e.g., a value from 0 to 31). Each LTE MCS index may be associated with a particular number of spatial stream, a modulation type (e.g., Binary Phase Key Shifting (BPKS), Quadrature Phase Key Shifting (QPKS), 16 phase Quadrature Amplitude Modulation (16-QAM), 64-QAM, etc.), a coding rate, and one or more data rates.

Data throughput column 620 may include entries for data throughput rates. Data throughput column 620 may include data throughput entries 622-A to 622-N. Each data throughput entry 622 may include a data throughput rate for a particular modulation and coding scheme based on one or more quality of service (QoS) requirements. The QoS requirements may include a packet loss rate requirement, a block error rate (BLER) requirement, a Reference Signal Receive Power (RSRP) requirement, a Received Signal Strength Indicator (RSSI) requirement, a pathloss value requirement, a shared channel transmitting power requirement, a control channel transmitting power requirement, a percent of time interval reaching maximum power requirement, an antenna reflected power requirement, and/or another type of QoS requirement.

Service area column 630 may include entries for service area values. Service area column 630 may include service area entries 632-A to 632-N. Each service area entry 632 may include information identifying a service area (e.g., radius or distance from base station 130) at which the RF conditions satisfy the QoS requirements. The service area may be computed based on parameters associated with a particular MCS, based on information obtained from UE devices 110 serviced by base station 130, based on measurements performed by other wireless devices in the service area, and/or using another technique.

Number of UEs column 640 may include entries for the number of UE devices 110. Number of UEs column 640 may include number of UEs entries 642-A to 642-N. Each number of UEs entry 642 may identify the number of UE devices 110 serviced by base station 130 that are in the service area specified by the corresponding service area entry 632.

System throughput column 650 may include entries for determined system throughput values. System throughput column 650 may include system throughput entries 652-A to 650-N. Each system throughput entry 652 may store a determined system throughput value for a corresponding modulation and coding scheme based on the data throughput value associated with the modulation and coding scheme and based on the number of UE devices 110 in the determined service area for the modulation and coding scheme. For example, the system throughput value may be determined as the product of the data throughput value and the number of UE devices 110.

Although FIG. 6 shows exemplary components stored in throughput table 520, in other implementations throughput table 520 may include fewer components, different components, differently arranged components, or additional components than depicted in FIG. 6.

Figure 7:
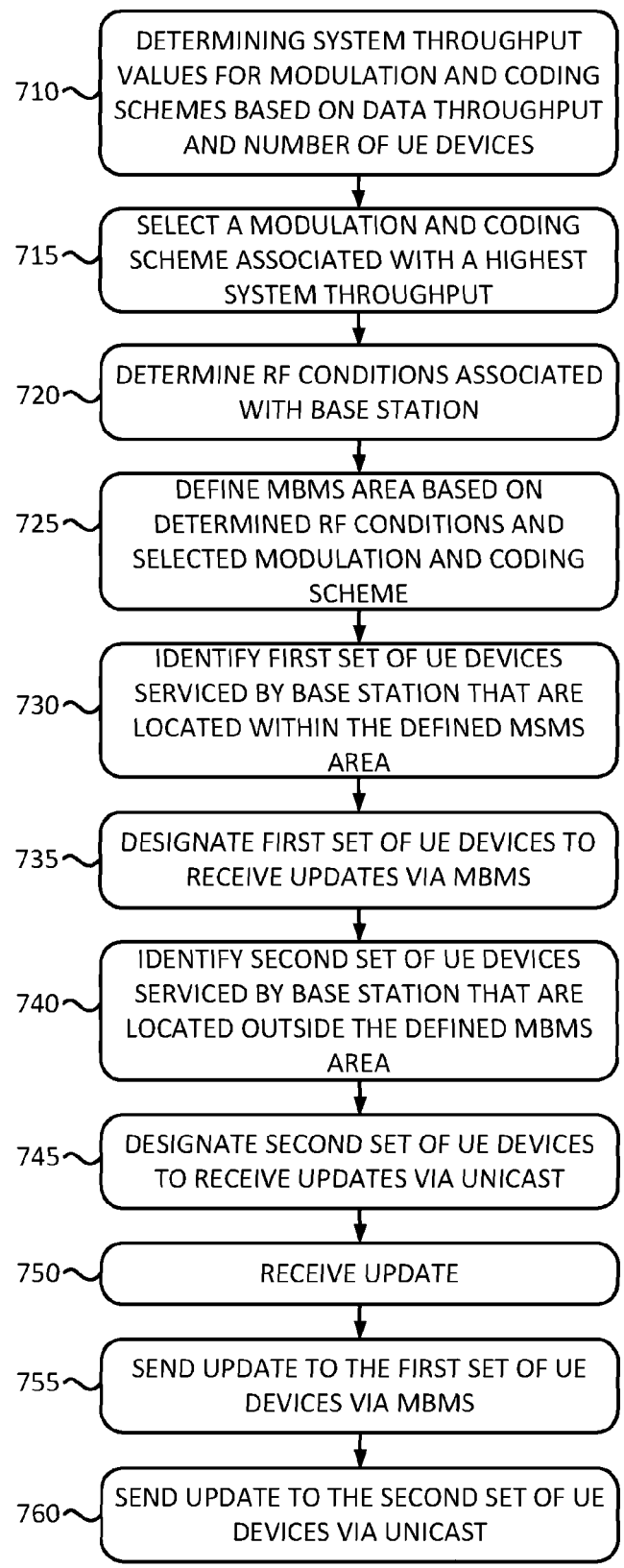
FIG. 7 is a flowchart of a process for sending updates according to an implementation described herein.

FIG. 7 is a flowchart of a process for sending updates according to an implementation described herein. In some implementations, the process of FIG. 7 may be performed by base station 130 (e.g., eNodeB 210). In other implementations, some or all of the process of FIG. 7 may be performed by another device or a group of devices separate from base station 130. For example, some or all of the process of FIG. 7 may be performed by MCE 330.

The process of FIG. 7 may include determining system throughput values for modulation and coding schemes based on data throughput and the number of UE devices (block 710). A process for determining the system throughput values is described below with reference to FIG. 8. A modulation and coding scheme associated with the highest system throughput may be selected (block 715), RF conditions associated with the base station may be determined (block 720), and an MBMS area may be determined based on the selected modulation and coding scheme and on the determined RF conditions (block 725). For example, throughput manager 510 may select the modulation and coding scheme associated with the highest system throughput based on throughput table 520 and may define the MBMS area as the service area associated with the selected modulation and coding scheme, which was determined based on the RF conditions associated with base station 130, from throughput table 520.

A first set of UE devices, serviced by the base station, may be identified that are within the defined MBMS area (block 730) and the first set of UE devices may be designated to receive updates via MBMS (block 735). For example, update manager 530 may access UE DB 540, may identify UE devices 110 that are within the defined MBMS area, and may designate the identified UE devices 110 as devices that are to receive updates via MBMS.

A second set of UE devices, serviced by the base station, may be identified that are outside the defined MBMS area (block 740) and the second set of UE devices may be designated to receive updates via unicast (block 745). For example, update manager 530 may access UE DB 540, may identify UE devices 110 that are outside the defined MBMS area, and may designate the identified UE devices 110 as devices that are to receive updates via unicast.

An update may be received (block 750), the update may be sent to the first set of devices using MBMS (block 755), and the update may be sent to the second set of devices using unicast (block 760). For example, update system 150 may generate an update and the update may be sent to base station 130. Update manager 530 may generate an MBMS update using MBMS interface 550 and may send to update to the first set of UE devices 110 that are within the defined MBMS area. Update manager 530 may then send the update individually to the UE devices 110 in the second set via unicast. If a particular UE device 110 does not receive a complete update file during a multicast transmission, or detects errors in the update file received via the multicast transmission, the particular UE device 110 may perform a repair process via unicast by communicating with BM-SC 310 or may fetch the update file from BM-SC 310 via unicast.

The MBMS area may be updated based on a change in the number of UE devices 110 serviced by the base station. Thus, if a change (i.e., increase or decrease) is detected in the number of UE devices 110 serviced by base station 130 that is greater than a change threshold, the system throughput values may be recalculated for the set of modulation and coding schemes and blocks 715, 720, 725, 730, 735, 740, and 745 may be repeated to update the first and second set of UE devices 110 based on a re-defined MBMS area.

Figure 8:
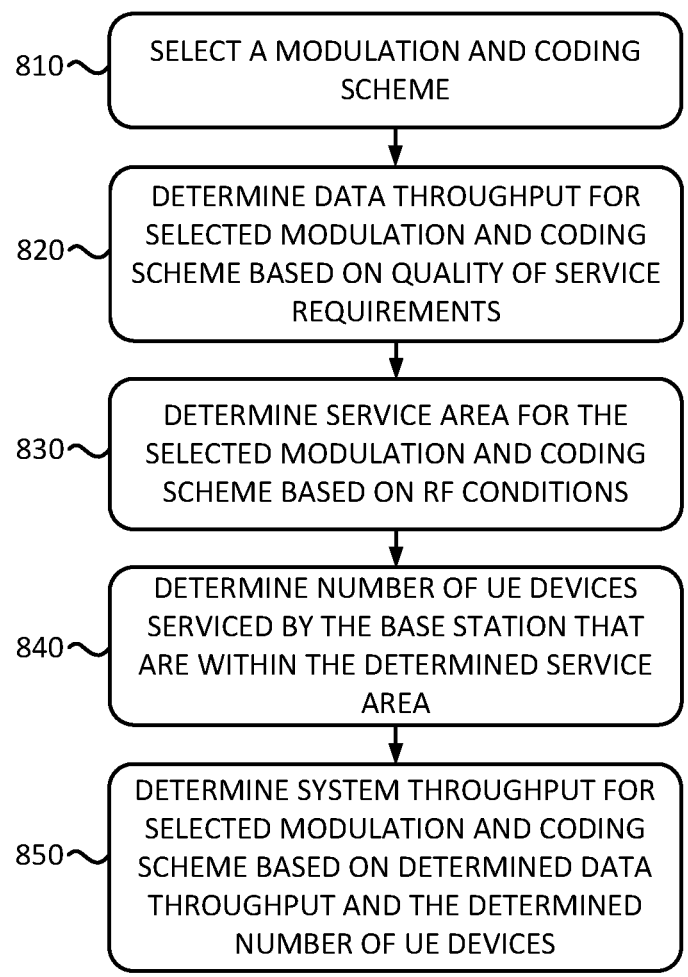
FIG. 8 is a flowchart of a process for determining system throughputs according to an implementation described herein.

FIG. 8 is a flowchart of a process for determining system throughputs according to an implementation described herein. In some implementations, the process of FIG. 8 may be performed by base station 130 (e.g., eNodeB 210). In other implementations, some or all of the process of FIG. 8 may be performed by another device or a group of devices separate from base station 130. For example, some or all of the process of FIG. 8 may be performed by MCE 330.

The process of FIG. 8 may include selecting a modulation and coding scheme (block 810) and determining the data throughput for the selected modulation and coding scheme based one or more QoS requirements (block 820). For example, throughput manager 510 may determine the QoS requirements based on a particular modulation and coding scheme, based on the types of UE devices 110, based on subscription specifications associated with the UE devices 110, based on requirements associated with wireless access network 120, and/or based on other parameters. Throughput manager 510 may determine the data throughput rates for the selected modulation and coding scheme based on the determined QoS requirements and based on specifications and/or data associated with the selected modulation and coding scheme. As an example, each modulation and coding scheme may have a defined data throughput rate for a particular set of QoS requirements. As another example, the data throughput rate may be measured by base station 130 and/or by another device.

The service area for the selected modulation and coding scheme may be determined based on the RF conditions (block 830) and the number of UE devices serviced by the base station that are within the determined service area may be determined (block 840). For example, throughput manager 510 may compute the service area by determining the maximum distance from base station 130 at which the QoS requirements are still satisfied. The service area may be computed based on parameters associated with the selected modulation and coding scheme, based on information obtained from UE devices 110 serviced by base station 130, based on measurements performed by other wireless devices in the service area, and/or using another technique.

The system throughput requirement may be determined for the selected modulation and coding scheme based on the determined data throughput and the determined number of UE devices (block 850). For example, throughput manager 510 may compute the system throughput for the selected modulation and coding scheme as the product of the data throughput value for the selected modulation and coding scheme and the number of UE devices 110 in the determined service area for the modulation and coding scheme.

Figure 9:
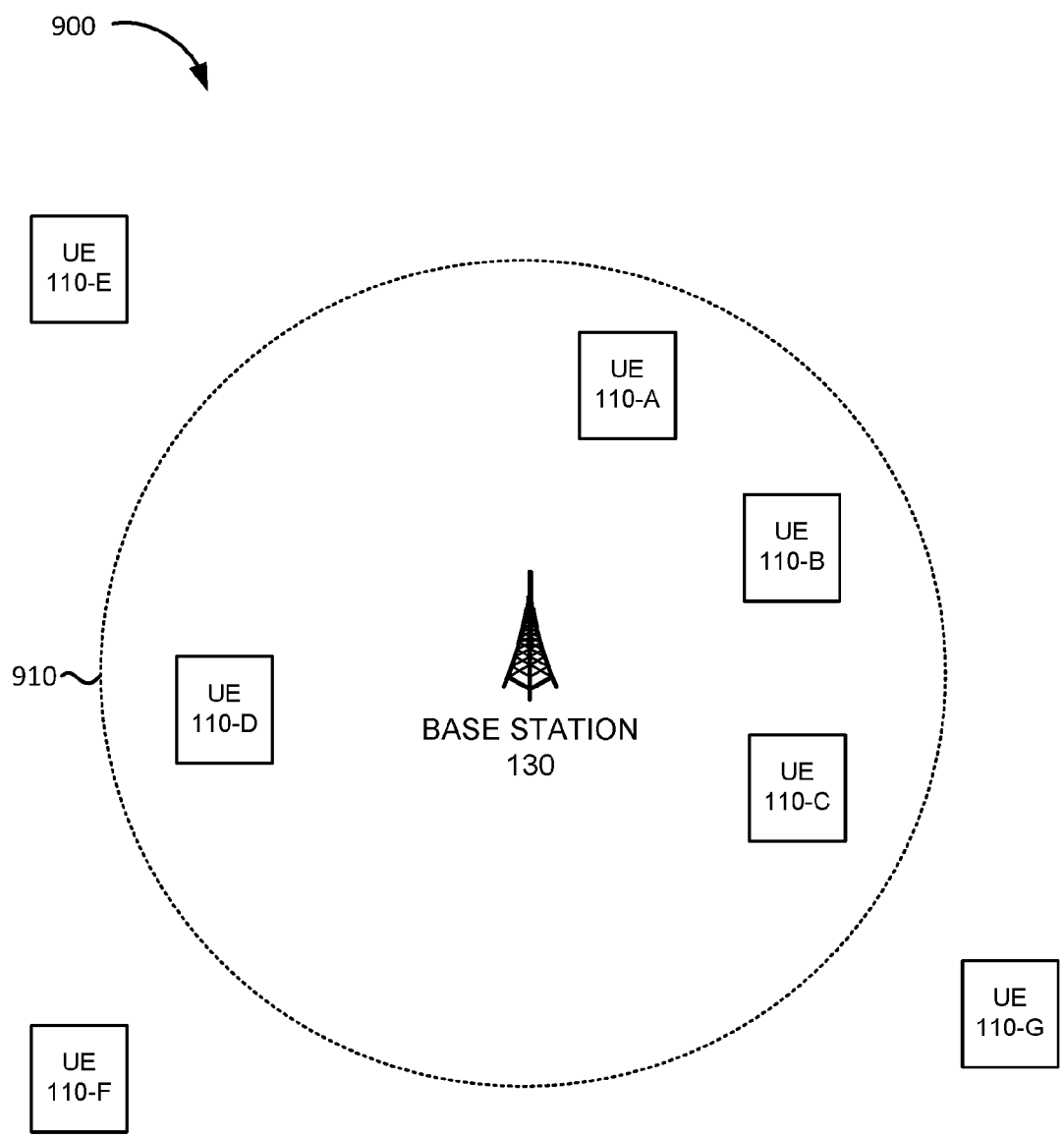
FIG. 9 is a diagram of an exemplary system according to an implementation described herein.

FIG. 9 is a diagram of an exemplary system 900 according to an implementation described herein. As shown in FIG. 9, system 900 may include base station 130 and UE devices 110-A, 110-B, 110-C, 110-D, 110-E, 110-F, and 110-G. An MBMS area 910 may be defined as shown in FIG. 9. Thus, UE devices 110-A, 110-B, 110-C, and 110-D may be located inside defined MBMS area 910 and may be designated to receive updates via MBMS. Furthermore, devices 110-E, 110-F, and 110-G may be located outside defined MBMS area 910 and may be designated to receive updates via unicast.

Figure 10:
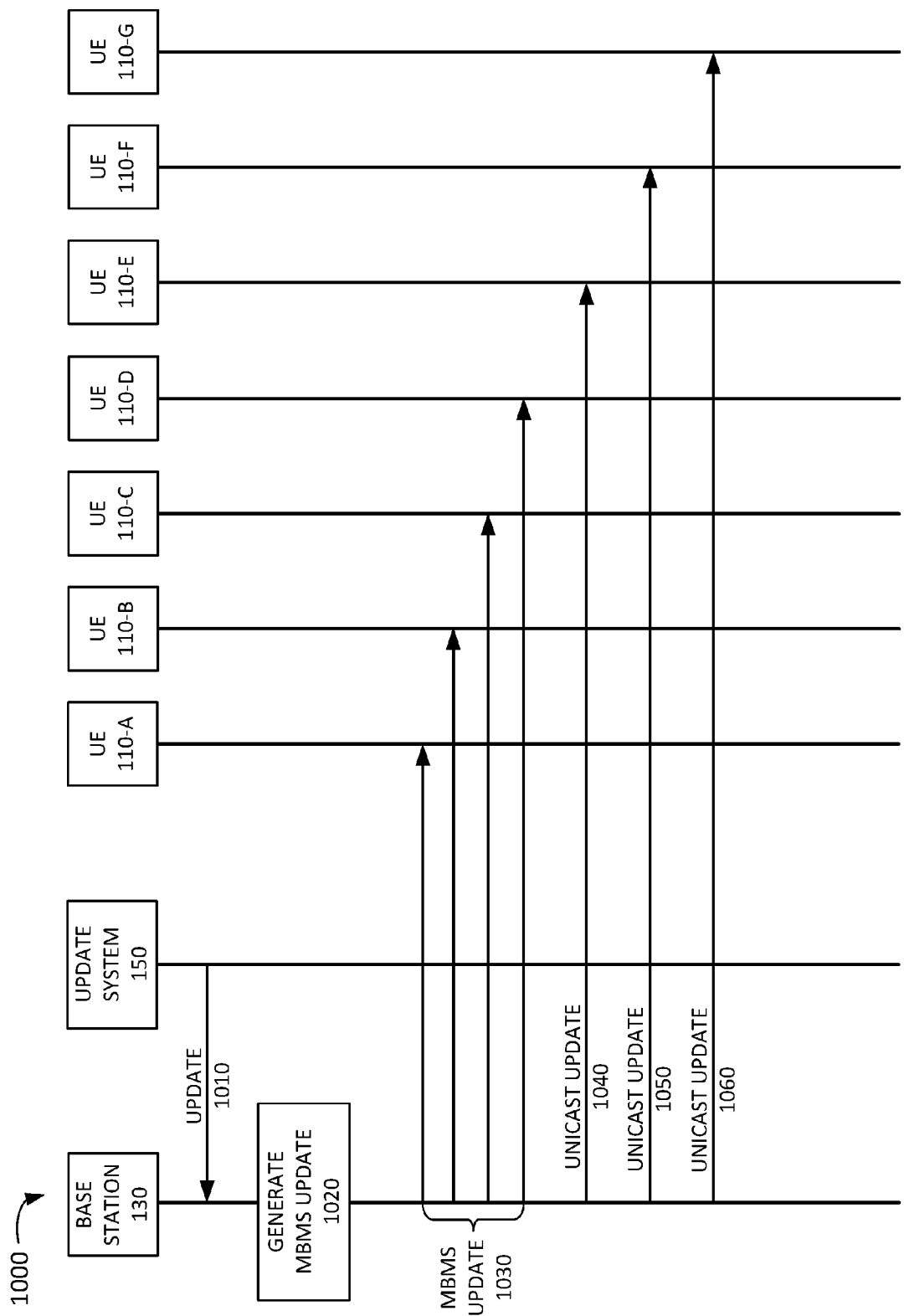
FIG. 10 is a diagram of an exemplary signal flow according to an implementation described herein.

FIG. 10 is an exemplary diagram of a signal flow 1000 associated with system 900 of FIG. 9 according to an implementation described herein. As shown in FIG. 10, signal flow 1000 may include update system 150 sending an update to base station 130 (signal 1010). Base station 130 may generate an MBMS update (block 1020) and may send the MBMS update to UE devices 110 within defined MBMS area 910 (signal 1030). Thus, UE devices 110-A, 110-B, 110-C, and 110-D may receive the update via MBMS update 1030. Base station 130 may then send a first unicast update to UE device 110-E (signal 1040), may send a second unicast update to UE device 110-F (signal 1050), and may send a third unicast update to UE device 110-G (signal 1060).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signal flows has been described with respect to FIG. 10, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:

determining, by the computer device, system throughput values for a plurality of modulation and coding schemes based on data throughput values and based on a number of user equipment (UE) devices serviced by a base station;

selecting, by the computer device, a modulation and coding scheme, of the plurality of modulation and coding schemes, that is associated with a highest system throughput;

determining, by the computer device, radio frequency (RF) conditions associated with the base station;

defining, by the computer device, a Multimedia Broadcast Multicast Service (MBMS) area based on the determined RF conditions and the selected modulation and coding scheme;

providing, by the computer device, an update to the UE devices serviced by the base station, wherein UE devices located within the defined MBMS area are sent the update using MBMS and UE devices located outside the defined MBMS area are sent the update using unicast;

detecting, by the computer device, a change in the number of UE devices serviced by the base station that is greater than a change threshold; and recalculating, by the computer device, the system throughput values for the plurality of modulation and coding schemes based on the data throughput values and based on a new number of UE devices serviced by the base station based on the detected change, in response to detecting the change in the number of UE devices serviced by the base station.

2. The method of claim 1, wherein providing the update to the UE devices serviced by the base station includes:
identifying a first set of UE devices, of the UE devices serviced by the base station, located within the defined MBMS area;
designating UE devices in the first set of UE devices to receive updates via MBMS;
identifying a second set of UE devices, of the UE devices serviced by the base station, as located outside the defined MBMS area; and
designating UE devices in the second set of UE devices to receive updates via unicast.

3. The method of claim 2, further comprising:
receiving an update from a system configured to provide updates for the UE devices serviced by the base station;
sending the update via MBMS to the first set of UE devices; and
sending the update via unicast to the second set of UE devices.

4. The method of claim 1, further comprising:
instructing at least some of the UE devices serviced by the base station to schedule to wake up at a time at which the update is scheduled.

5. The method of claim 1, further comprising:
determining a data size for the update; and
wherein defining the MBMS area is further based on the determined data size for the update.

6. The method of claim 1, wherein determining the system throughput values for the plurality of modulation and coding schemes based on data throughput values and based on the number of UE devices serviced by the base station includes:
selecting a modulation and coding scheme;
determining a data throughput for the selected modulation and coding scheme based on one or more quality of service requirements;
determining a service area for the selected modulation and coding scheme based on the determined RF conditions;
determining a number of UE devices, of the number of UE devices serviced by the base station, that are located within the determined service area; and
determining a system throughput associated with the selected modulation and coding scheme based on the determined data throughput and the determined number of UE devices that are located within the determined service area.

7. The method of claim 6, further comprising:
generating a table, wherein a row of the table relates the selected modulation and coding scheme to the determined data throughput, the determined service area, the determined number of UE devices, and the determined system throughput.

8. The method of claim 1, wherein the UE devices serviced by the base station include fixed wireless devices configured to communicate with the base station using Machine-Type Communication (MTC).

9. A base station comprising:
logic configured to:
determine system throughput values for a plurality of modulation and coding schemes based on data throughput values and based on a number of user equipment (UE) devices serviced by the base station, wherein, when determining the system throughput values, the logic is further configured to;
determine a data throughput for a particular modulation and coding scheme based on one or more quality of service requirements;
determine a number of UE devices, of the number of UE devices serviced by the base station, that are located within a service area associated with the particular modulation and coding scheme; and
determine a system throughput associated with the particular modulation and coding scheme based on the determined data throughput and the determined number of UE devices;
select a modulation and coding scheme, of the plurality of modulation and coding schemes, that is associated with a highest system throughput;
determine radio frequency (RF) conditions associated with the base station;
define a Multimedia Broadcast Multicast Service (MBMS) area based on the determined RF conditions and the selected modulation and coding scheme; and
provide an update to the UE devices serviced by the base station, wherein UE devices located within the defined MBMS area are sent the update using MBMS and UE devices located outside the defined MBMS area are sent the update using unicast.

10. The base station of claim 9, wherein, when providing the update to the UE devices serviced by the base station, the logic is further configured to:
identify a first set of UE devices, of the UE devices serviced by the base station, located within the defined MBMS area;
designate UE devices in the first set of UE devices to receive updates via MBMS;
identify a second set of UE devices, of the UE devices serviced by the base station, as located outside the defined MBMS area; and
designate UE devices in the second set of UE devices to receive updates via unicast.

11. The base station of claim 10, wherein the logic is further configured to:
receive an update from a system configured to provide updates for the UE devices serviced by the base station;
send the update via MBMS to the first set of UE devices; and
send the update via unicast to the second set of UE devices.

12. The base station of claim 9, wherein the logic is further configured to:
instruct at least some of the UE devices serviced by the base station to schedule to wake up at a time at which the update is scheduled.

13. The base station of claim 9, wherein the logic is further configured to:
detect a change in the number of UE devices serviced by the base station that is greater than a change threshold; and
recalculate the system throughput values for the plurality of modulation and coding schemes based on the data throughput values and based on a new number of UE devices serviced by the base station based on the detected change, in response to detecting the change in the number of UE devices serviced by the base station that is greater than the change threshold.

14. The base station of claim 9, wherein the logic is further configured to:
   determine a data size for the update; and
   wherein the logic is configured to define the MBMS area further based on the determined data size for the update.

15. The base station of claim 9, wherein when determining the number of UE devices that are located within the service area associated with the particular modulation and coding scheme, the logic is further configured to:
   determine the service area for the particular modulation and coding scheme based on the determined RF conditions.

16. The base station of claim 9, wherein the logic is further configured to:
   generate a table, wherein a row of the generated table relates the particular modulation and coding scheme to the determined data throughput, the determined service area, the determined number of UE devices, and the determined system throughput.

17. The base station of claim 9, wherein the UE devices serviced by the base station include fixed wireless devices configured to communicate with the base station using Machine-Type Communication (MTC).

18. A non-transitory memory device storing instructions executable by one or more processors, the non-transitory memory device comprising:
   one or more instructions to determine system throughput values for a plurality of modulation and coding schemes based on data throughput values and based on a number of user equipment (UE) devices serviced by a base station, wherein the one or more instructions to determine the system throughput values further include;
      one or more instructions to determine a data throughput for a particular modulation and coding scheme based on one or more quality of service requirements;
      one or more instructions to determine a number of UE devices, of the number of UE devices serviced by the base station, that are located within a service area associated with the particular modulation and coding scheme; and
      one or more instructions to determine a system throughput associated with the particular modulation and coding scheme based on the determined data throughput and the determined number of UE devices;
   one or more instructions to select a modulation and coding scheme, of the plurality of modulation and coding schemes, that is associated with a highest system throughput;
   one or more instructions to determine radio frequency (RF) conditions associated with the base station;
   one or more instructions to define a Multimedia Broadcast Multicast Service (MBMS) area based on the determined RF conditions and the selected modulation and coding scheme; and
   one or more instructions to provide an update to the UE devices serviced by the base station, wherein UE devices located within the defined MBMS area are sent the update using MBMS and UE devices located outside the defined MBMS area are sent the update using unicast.

19. The non-transitory memory device of claim 18, wherein the one or more instructions to determine the number of UE devices that are located within the service area associated with the particular modulation and coding scheme further include:
   one or more instructions to determine the service area for the particular modulation and coding scheme based on the determined RF conditions.

20. The non-transitory memory device of claim 18, further comprising:
   one or more instructions to generate a table, wherein a row of the generated table relates the particular modulation and coding scheme to the determined data throughput, the determined service area, the determined number of UE devices, and the determined system throughput.

* * * * *